Oct. 22, 1963 M. C. BLEND, JR 3,107,649
DEVICE FOR CONVERTING VEHICLE TRUNKS INTO ANIMAL PENS
Filed Jan. 16, 1962 2 Sheets-Sheet 1

*INVENTOR.*
MERLE C. BLEND, JR.
BY

*ATTORNEY*

Oct. 22, 1963          M. C. BLEND, JR          3,107,649
DEVICE FOR CONVERTING VEHICLE TRUNKS INTO ANIMAL PENS
Filed Jan. 16, 1962                         2 Sheets-Sheet 2
FIG. 4
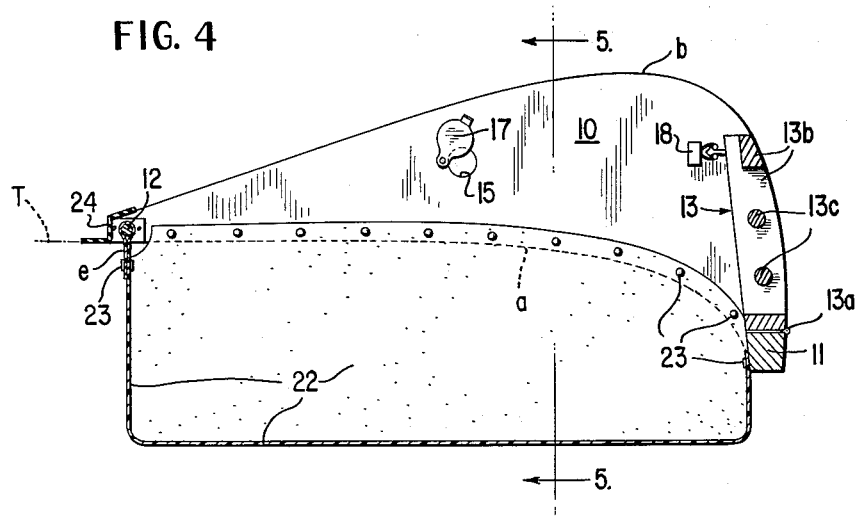
FIG. 5
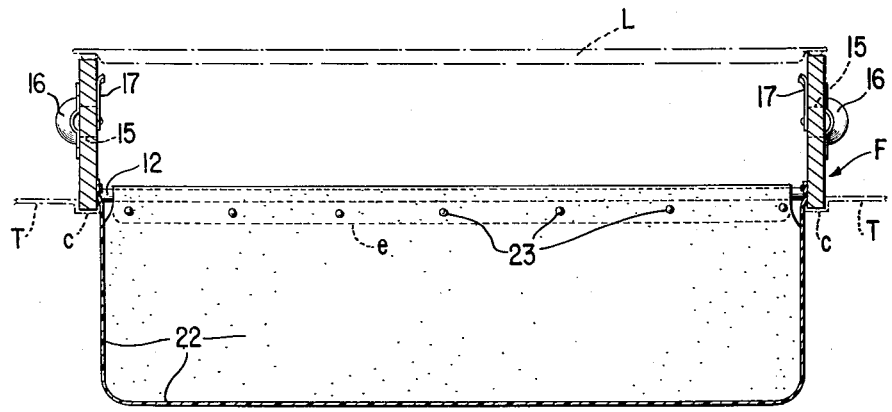
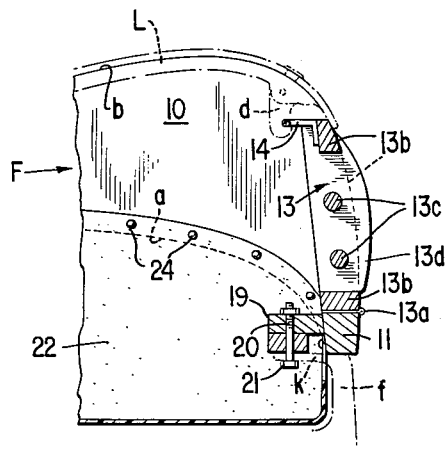
FIG. 6
INVENTOR.
MERLE C. BLEND, JR.
BY
ATTORNEY

United States Patent Office 3,107,649
Patented Oct. 22, 1963

3,107,649
DEVICE FOR CONVERTING VEHICLE TRUNKS
INTO ANIMAL PENS
Merle C. Blend, Jr., Rte. 3, Box 49F, Summerton, S.C.
Filed Jan. 16, 1962, Ser. No. 166,531
3 Claims. (Cl. 119—15)

The present invention relates to an improvement in for converting a tonneau or trunk compartment of an automobile into a carrier or pen for animals.

It has become quite a problem, and expensive, for hunters to transport their dogs to hunting areas and for those, who wish to travel by an automobile, to transport their pets, such as dogs and cats and even birds. Therefore, many urbanites leave their pets with kennels or other custodians, when they travel, but would prefer to have their pets accompany them.

There have been several suggestions in the past providing some means at the rear of an automobile for the housing and transportation of small animals, such as dogs, cats, fowl and the like, but in all of these cases, of which I have knowledge, a container of some type is associated with the rear portion of the vehicle which obstructed the view of the operator through the rear window of the vehicle to the traffic or conditions of the road behind him, except in one case (as in United States Patent No. 2,194,993), where the device consists of many movable parts and is difficult and clumsy in operation and manipulation, and which is not suitable or applicable to automobile bodies of present day construction.

The main object of the invention is to overcome the above mentioned drawbacks by the provision of an improved box-like isolation chamber within the area of the trunk-compartment defined by the trunk-opening of a present-day passenger automobile and having a unitary rigid rectangular frame insertable between the edges of said trunk-opening and its partially opened lid-cover to form vertical side and rear walls rising from and supported by the former and roofed by the latter, when closed thereupon, for giving additional vertical height to said area of the trunk compartment, while not obstructing the view of the operator through the rear window of the automobile, and having a depending flexible bag-like container suspended from the frame to the floor of the trunk-compartment to isolate the pen device from articles stored within the compartment outside of the pen chamber.

Another object of the invention is to provide the flexible bag-like container of a liquid impervious material removably attached to the supporting frame, thus protecting the trunk compartment and other articles therein from undesirable matter or substances emanating from animals that may be carried in the pen device, permitting the container to be removed from the frame for cleaning whether the pen device is in place in the vehicle or not, and permitting the overall size of the device to be reduced considerably for storage when not in use.

A further object of the invention is to provide an isolating pen device, as above defined, which is of very simple and relatively inexpensive construction and which may be applied and removed to and from operative position with respect to the automobile trunk compartment with the slightest of effort.

These and other objects of the invention will be apparent from the following description made in connection with the accompanying drawings, in which like reference characters refer to similar or like parts throughout the several views and in which—

FIGURE 4 is a sectional view of the invention taken substantially on line 4—4 in FIGURE 2;

Figure 2:
FIGURE 2 is a perspective view of the present invention removed from the vehicle.

FIGURE 5 is a sectional view of the invention taken substantially on line 5—5 in FIGURE 4, with cooperating portions of the trunk wall and its lid being shown in dot-and-dash lines to illustrate the position of the invention with respect thereto, when the invention is inserted in position and with the trunk lid closed; and FIGURE 6 is a fragmentary sectional view of FIGURE 2, with the cooperating parts of the trunk being shown in dot-and-dash lines, to illustrate the manner of inserting the device of this invention and how it is secured to the trunk and the lid and how it may be locked in its cooperating closed position therewith.

In automobiles of present-day design, an endeavor is made to provide a luggage carrying compartment of generous proportions, and formed at one end of the vehicle-body construction (FIGURE 1) to provide a horizontally elongated trunk-like chest or compartment T disposed below the plane of a rear window W of the body (or, at least, not above the top of the seat-backs of the vehicle) and extending substantially across the width of said body V. This trunk compartment is formed by the skin-metal of the body and has a continuous opening at its top and rear sides which is covered by a lid L hinged (as at $h$) to the skin-metal of the body that forms the upper forward edge of the opening. The major portion of the lid L, which forms the top wall of the trunk compartment, is generally horizontal, when in normally closed position, and has its distal end portion curved downwardly to form the major rear wall of the trunk, a key-controlled lock or detent $d$ being disposed at the marginal edge of the distal end to cooperate with a lock-keeper $k$ carried on an upstanding lip or flange $f$ of the skin-metal and projecting within the compartment T.

The above describes generally the type of vehicle trunk compartment with which the pen device of the present invention is designed for use, and which is usually positioned at the rear end of the vehicle, although said device is equally useful in those types of vehicles, where the engine is in the rear and the trunk is in the front end portion of the vehicle. In either case, the usual construction of the trunk compartment is such that the edge of the skin-metal, forming and defining the opening of the trunk compartment, is formed into a depressed drain channel, generally indicated at $c$ in FIGURE 5, which receives the edge portions of the lid L, there being ordinarily a sealing gasket (not shown) associated with the lid and the channel to assure against leakage of water or dust into the trunk compartment.

Also, it will be understood that, while the construction and disposition of the trunk compartment has been described generally, its external design or contour, and of its lid, may vary slightly in different makes or models of automobiles and the device of the present invention may be slightly modified in shape to conform thereto.

Figure 1:
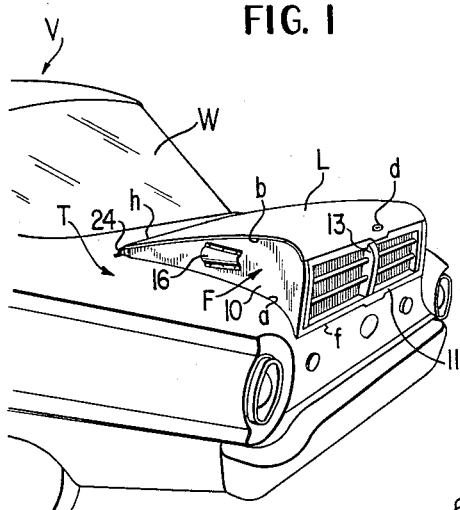
FIGURE 1 is a perspective view of the rear-end portion of an automobile, illustrating its trunk compartment equipped with the present invention.
Figure 3:
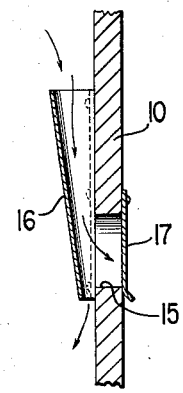
FIGURE 3 is an enlarged sectional view of an air-funnel taken substantially on line 3—3 in FIGURE 2.
Figure 3:
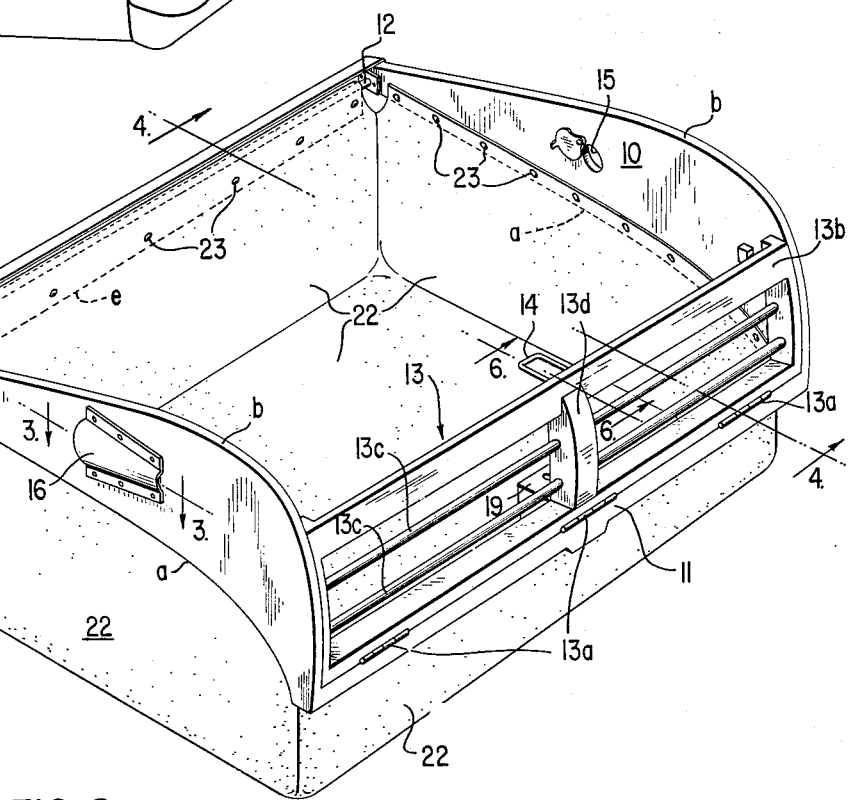

The device of the present invention comprises a unitary rigid rectangular frame F composed of two spaced and substantially parallel side walls 10, each generally of right-angle shape, connected by a horizontal spacer-bar or sill 11 extending between the juncture of their bases with their hypotenuses and connected at their apexes (or narrow ends) by a spacer and brace rod 12. The hypotenuse or lower edge $a$ of the side walls 10 is so dimensioned and shaped as to fit within the drain channels $c$ at the side rim edges of the opening of a trunk compartment T and to conform with the contour thereof, as shown in FIGURES 1 and 5, while the sill 11 rests upon and has its lower edge shaped to conform to the upstanding lip or flange f, which usually forms the lower portion of the rear wall of the trunk compartment, as shown in FIGURE 6. The opposite or upper edge b of the said walls 10 is shaped to conform with the shape of the side edges of the lid L of the trunk compartment.

A grating 13 is positioned between the wider or rear ends of said walls 10 and extends upwardly from the sill 11 for a distance in order to provide light, ventilation and, in effect, a window for the animals confined in the compartment. This grating 13 has its lower edge hinged, as at 13a, to the sill 11 so as to swing outwardly and downwardly, thus providing a gate to facilitate easier ingress and egress of the animals to and from the pen.

The grating 13 may be of any suitable construction, but is shown as comprising a rectangular frame 13b having spaced bars 13c extending between opposite members of the gate frame, preferably the vertical side members of the gate frame, and extending through a centrally disposed bolster-brace 13d secured at its ends to opposite horizontal members of the gate frame. The height of the gate frame 13 should be such that, when the lid L is closed down upon the edges b of the side walls 10 as shown in FIGURE 1 and the gate is in its raised or closed position, the distal edge of the lid L will slightly overlap the upper horizontal member of gate frame 13b, shown in FIGURE 6. It this position, the detent d will be in registering position to cooperate with a keeper 14, secured to the inner face of the upper horizontal bar of grating or gate, when the key-controlled mechanism of the lock is properly actuated. The keeper 14 will be of the type and kind as the keeper k provided on the automobile for cooperation with the type of lock detent d provided on the trunk lid L.

In designing these side walls 10, their dimension at their wider ends (or the base ends of their generally right-angle shapes) is to be such that, when the frame F is inserted in position on the trunk with the lid L closed down upon it, as shown in FIGURE 1, the distal end of the lid L will be in slightly elevated position from that which is its normally closed position when the frame F is not inserted therebetween. This slight elevation offers no obstruction to the rear view of the operator of the vehicles of oncoming traffic or the conditions of the road behind him. I found that the widest dimension of the said walls 10 may be from 6 to 12 inches, depending upon the make of automobile, without in any way obstructing the rear view of the driver or operator of the automobile, while, at the same time, providing sufficient additional vertical space for animals, of fairly large size, to be comfortably housed within pen chamber under the lid of the trunk compartment. For instance, one of the devices which I have in use at present for a 1961 Ford-Falcon automobile, will house three pointer dogs with comfort, and it is the device that is depicted in FIGURE 1.

The side walls 10 are provided with openings 15 and each is covered externally by a cowling funnel 16, which is open at both ends to allow sufficient air, without causing violent blasts or drafts to enter the animal pen while the vehicle is at high speeds. The air flow through those openings may be regulated or controlled by a valve means in the form of a pivoted damper 17 mounted on the inner faces of the walls 10 adjacent the openings 15. Suitable latch members 18 are also secured to the inner faces of the side walls 10 adjacent the distal end of the grating or gate 13 for holding the gate in its elevated or closed position.

The sill 11 is provided at its center portion with an inwardly extending projection 19 having a vertical opening 20 therethrough and through which a suitable fastener, such as a bolt, will extend to cooperate with the type of keeper k provided on the automobile, when the frame F is inserted in position as shown in FIGURE 1, and with which the detent d of the lid L will cooperate when the frame F is not used or in place. However, with the type of keeper k shown and when the frame F is so positioned, as shown in FIGURES 1 and 6, the frame F is firmly secured in position by a headed-bolt or a J-bolt and nut 21, which extends through the opening in or hooks about the keeper k and extends through the opening 20 in the projection 19.

To complete the isolating pen device, a rectangular bag-like container 22, of a liquid impervious flexibly limp sheet material, depends from the frame F and is formed to have side, end and bottom walls of a depth so that its bottom will rest on the floor or bottom wall of the trunk compartment. This bag-like container has its upper edge portions removably attached to the lower inner faces of the side walls 10 and of the sill 11 by snap-fasteners 23 and is provided at its forward wall with a flap-extension e, which extends over and around the rod 12 and is secured to the forward wall of the container by similar snap-fasteners 23, in the manner shown particularly in FIG. 4. Hence, the container 22 may be quickly installed and removed for cleaning purposes. The container 22 may not be used in all instances, particularly when it is desired to use the enlarged trunk area for other purposes than an animal pen or to give the animal or animals access to a larger area in the trunk compartment, when excretions therefrom are of no concern, but it is highly useful when carrying animals and precaution is needed or desired to protect the trunk compartment itself as well as luggage or other articles that may be stored within the trunk compartment in those areas thereof lying beyond the container 22.

The narrow end of the frame F, which lies adjacent the hinged end of the lid L when the frame is inserted in position, as herein shown and described, is preferably provided with a strip of plastic material 24 which extends between and is secured to the said end of the walls 10 and is of a width to project outwardly and forwardly thereof through the space between the hinged end of the lid L and the cooperating rim edge portion of the trunk or vehicle body. This strip, having plastic property, can be pressed by the hand into tight contact with the underlying portion of the vehicle body to exclude and divert rain and water from entering the trunk compartment through the space caused by a partial opening of the lid to accommodate the frame F.

It is believed that the use of the frame F is clear from the above description and that all of the aforementioned objects are attained by the frame F.

Having thus described the invention and the manner in which it is to be performed, it is understood that the invention is not to be limited to the exact form herein described as it may be varied or modified within the scope of the appended claims and that said modifications are contemplated thereby.

That which is claimed, as new and to be secured by Letters Patent, is:

1. In a horizontally elongated trunk compartment of a passenger automobile having a rectangular top opening covered by a conforming lid hinged thereto at its innermost edge, the combination with a rectangular open frame dimensioned to rest upon and conform to the side and outermost edges of the trunk opening and removably mounted thereon to have its side and outermost members extend for a distance thereabove, a bag-like container of liquid impervious flexibly limp sheet material, forming a bottom wall and an enclosing vertical wall, releasible means securing the upper edge portions of the vertical wall to and about the four members of said rectangular frame and depending therefrom for a distance to permit its bottom wall to rest on the floor of said trunk compartment and underlie the opening thereof, the top edges of the side and outermost members of the frame being shaped to conform to the side and distal edges, respectively, of said lid and fittedly contact therewith when the lid is lowered thereupon, means releasibly holding the frame in position, means for releasibly locking the lid upon said frame, and ventilating means in said frame, whereby an isolating and sanitary animal pen carrier is provided wholly within the trunk-compartment and its lid.

2. A device for providing a protective and isolating animal pen within the area underlying the hinged lid of a top opening in a horizontal elongated trunk-compartment of a passenger automobile, when said lid is partially raised, so as to be unobstructive to the vision of the operator through the rear window of said automobile yet provide the roof of said pen; said device comprising a rigid unitary rectangular frame having two spaced and generally right-angularly shaped coextensive side walls with their hypotenusal edges lowermost and connected at the lower corners of their wider ends by a sill-bar and at their apexes by a rod, said frame being dimensioned and the bottom edges of said side walls and of said sill-bar being shaped to conform to and to rest upon and be supported by the defining side and rear edges, respectively, of the opening of said trunk compartment, when the frame is inserted between the opened lid and said edges of the opening of said trunk compartment; a rectangular container of flexibly limp liquid impervious sheet material having front, rear, side and bottom walls and having its upper edge portions detachably connected to the said rod, to said sill-bar and to side walls of said frame and depending therefrom so that the bottom wall of the container will rest on the floor of the trunk compartment to protect the compartment and articles therein outside of said pen from undesirable matter or substances emanating from the animal; a grating-type rear wall for said frame normally lying coincident with the base line edges of said right angular side walls and hinged at its lower edge to said sill-bar to swing outwardly and downwardly, the top edges of the side walls and of the rear wall of said frame being shaped to conform to the contour of the side and rear edges of said lid so that said lid may be brought into fitted contact therewith and roof said frame, means for releasibly locking said lid to said rear wall of the frame; and means of releasibly securing said sill to the rear edge of the trunk opening, whereby the pen is secured in position.

3. A device for providing a heightened area underlying the hinged lid of a top opening in a horizontal elongated trunk-compartment of passenger automobiles, when the lid is unlocked and partially raised so as to be unobstructive to the vision of the operator through the rear window of said automobile, said lid having a lock mechanism at its distal edge cooperating with a keeper at the rear edge of the trunk opening; said device comprising a rigid unitary rectangular frame having two spaced and generally right angularly shaped coextensive side walls with their hypotenusal edges lowermost and connected at the lower corners of their wider ends by a sill-bar and at their apexes by a rod, said frame being dimensioned and the bottom edges of said side walls and of said sill-bar being shaped to conform to and rest upon and be supported by the defining side and rear edges, respectively, of the opening of said trunk compartment, when said frame is inserted between the opened lid and said edges of the opening of said trunk compartment; fastening means on the sill to cooperate with the keeper at the rear edges of the trunk opening for holding the frame in position; a gate-type rear wall for said frame normally lying coincident with the base line edges of said right-angular side walls and hinged at its lower edge to said sill-bar to swing outwardly and downwardly, the top edges of the side walls and of the rear wall of said frame being shaped to conform to the contour of the side and rear edges of said lid so that said lid may be brought into fitted contact therewith and roof said frame; and a keeper means on the rear wall of the frame to cooperate with the locking mechanism of the lid for releasibly maintaining said lid in fitted contact with said frame and maintaining said rear wall in closed position.

References Cited in the file of this patent

UNITED STATES PATENTS

| | | |
|---|---|---|
| 1,837,596 | Taylor | Dec. 22, 1931 |
| 2,194,993 | Wuest | Mar. 26, 1940 |
| 2,246,813 | Preston | June 24, 1941 |
| 2,897,781 | Olson | Aug. 4, 1959 |
| 2,954,007 | Mitchell | Sept. 27, 1960 |